United States Patent Office 3,197,506
Patented July 27, 1965

3,197,506
BENZYLTHIOALKYLAMINO ALKOXY ALCOHOLS
Robert J. Wineman, Concord, Morton H. Gollis, Brookline, and John C. James, Melrose, Mass., assignors to Monsanto Research Corporation, St. Louis, Mo., a corporation of Delaware
No Drawing. Filed Feb. 28, 1962, Ser. No. 176,410
5 Claims. (Cl. 260—570.5)

This invention relates to new chemical compounds, and more particularly, provides novel (aralkylthio)alkylamino alkoxy alkanols.

An aminoalkanol having an (aralkylthio)alkyl radical as a substituent of the amine function has fixed properties of hydrophilicity, polarity and the like which are undesirable for certain applications. The same is true of corresponding (mercaptoalkylamino)alkanols which can be prepared therefrom. When these are used as physiological agents, for example, properties such as hydrophilicity and polarity appear to exert a pronounced effect on the activity in biological systems, presumably because such properties affect the facility with which the compounds are transported to the affected metabolic sites.

An object of this invention is to provide novel derivatives of (aralkythio)alkylamino alkanols.

A particular object of this invention is to provide novel alkoxy-substituted (aralkylthio)alkylamino alkanols.

These and other objects will become evident from a consideration of the following specification and claims.

In accordance with this invention, there are provided novel compounds which are (aralkylthio)alkylamino alkoxy alkanols of the formula

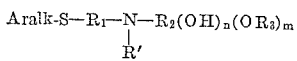

where each R is saturated aliphatic hydrocarbon,
R' is selected from the group consisting of hydrogen and saturated aliphatic hydrocarbon,
Aralk is an aralkyl hydrocarbon radical consiting of saturated aliphatic hydrocarbon substituted by a benzenoid ring, and
n and m are small integers each having a value of at least one.

By each R is meant each of $R_1$, $R_2$ and $R_3$. By a benzenoid ring is meant phenyl or alkylyphenyl such as tolyl. In the compounds of the invention, each hydrocarbon radical may contain up to 12 carbon atoms. The compounds in which each saturated aliphatic hydrocarbon radical is lower aliphatic, containing up to six carbon atoms, are preferred. For stability, at least two carbon atoms should intervene between the amine nitrogen atom and other hetero atoms (non-carbon atoms such as O and S), and the 2-thioalkyl and 3-thioalkyl compounds are preferred. An especially preferred group comprises the compounds in which the nitrogen atom is beta to each of the sulfur-substituted carbon atom and the oxygen-substituted carbon atom. Aralkyl is preferably 1-arylalkyl, and most preferably, benzyl. The sum of $m+n$ may be from 2 to 3.

The compounds contemplated and falling in the scope of the above formula include, for example, 1-([2-(benzylthio)ethyl]amino)-3-methoxy-2-propanol
1-([2-(benzylthio)ethyl]amino)-3-butoxy-2-propanol
1-([2-(benzylthio)ethyl]amino)-3-(dimethylbutoxy)-2-propanol
1-([2-(benzylthio)ethyl]amino)-3-isooctoxy-2-propanol
1-([2-(benzylthio)ethyl]amino)-3-dodecoxy-2-propanol
1-([2-(benzylthio)ethyl]amino)-3-cyclohexyloxy-2-propanol
1-([3-(benzylthio)propyl]amino)-3-methoxy-2-propanol
1-([2-(benzylthio)-1-methylpropyl]amino)-3-methoxy-2-propanol
1-([2-(benzylthio)-1-ethylbutyl]amino)-3-methoxy-2-propanol
1-([2-(benzylthio)dodecyl]amino)-3-methoxy-2-propanol
1-([2-(1-phenylethylthio)ethyl]amino)-3-methoxy-2-propanol
1-([2-(p-tolylmethylthio)ethyl]amino)-3-methoxy-2-propanol
1-([2-(benzylthio)ethyl]methylamino)-3-methoxy-2-propanol
1-([3-(benzylthio)propyl]methylamino)-3-methoxy-2-propanol
1-([2-(benzylthio)ethyl]butylamino)-3-methoxy-2-propanol
1-([2-(benzylthio)ethyl]decylamino)-3-methoxy-2-propanol
1-([2-(benzylthio)ethyl][4-hexylcyclohexyl]amino)-3-methoxy-2-propanol
1-([2-(benzylthio)ethyl]amino)-3-methoxy-2-butanol
1-([2-(benzylthio)ethyl]amino)-3-methoxy-2-methyl-2-propanol
2-([2-(benzylthio)ethyl]amino)-5-methoxycyclohexanol
2-([2-(benzylthio)ethyl]amino)-3-methoxy-1-dodecanol
3-([2-(benzylthio)ethyl]amino)-2-methoxy-1-propanol
4-([2-(benzylthio)ethyl]amino)-3-methoxy-1,2-butanediol
4-([2-(benzylthio)ethyl]amino)-2,3-dimethoxy-1-butanol and so forth.

A preferred method of making members of the stated class of compounds consists in opening the ring of a vic-epoxy ether in reaction with an aralylthioalkylamine. The method can be illustrated, for example, by reference to the reaction of 2,3-epoxypropyl methyl ether with a benzylthioalkylamine, as shown in the following equation:

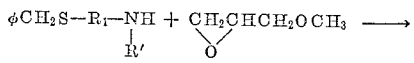

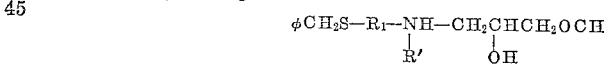

where $R_1$ and R' are as defined above and $\phi CH_2$ is the benzyl radical. It has been established that the epoxy ring opens at the least substituted carbon atom, so that epoxides such as 2,3-epoxypropyl methyl ether can be employed to produce a secondary alkanol.

Thus, presently useful epoxides comprise vic-epoxyalkyl ethers such as 2,3-epoxypropyl methyl ether, 2,3-epoxypropyl n-butyl ether, 2,3-epoxypropyl 2-methylbutyl ether, 2,3-epoxycyclohexyl methyl ether, and so forth. The aralkylthioalkylamines with which the epoxy compounds may be reacted in making the presently provided compounds are aralkylthioalkylamines wherein alkyl is saturated aliphatic hydrocarbon, the amine nitrogen atom carries at least one hydrogen substituent, and any N substituent other than H is saturated aliphatic hydrocarbon. Thus, useful amines include, for example 2-(benzylthio)ethylamine, 2-(benzylthio)-N-methylethylamine, 2-(benzylthio)-N-ethylethylamine, 2-(benzylthio)-N-propylethylamine, 3-(benzylthio)-1-propylamine, 2-(benzylthio)-1-butylamine, 2-(benzylthio)-1-propyl-1-nonylamine, 3-(benzylthio)-N-cyclohexyl-1-propylamine, 2-(tolymethylthio)-ethylamine, and so forth.

The conditions for conducting the stated ring-opening reaction may consist merely of contacting the epoxy compound with the amine. Reaction tends to be immediate and vigorous. The temperature may range from above freezing to below the decomposition temperature of the reaction mixture components, broadly; more particularly, holding the reaction temperature at 50–100° C. is favorable. The reaction may be exothermic and dropwise addition of the cyclic compound to the reaction mixture is usually preferable. Generally, not more than about one mole of the epoxy compound will be introduced per mole of amine, and less may be used where incomplete conversion is acceptable. Solvents and diluents are desirable, and useful solvents and diluents include, for example, hydrocarbons such as benzene and hexane; ethers such as diethyl ether and dioxane; alcohols such as methanol and ethanol, and so forth. Maintaining an atmosphere of nitrogen over the reaction mixture is useful in preventing access of air. Atmospheric pressures are suitable, though variation of pressure above and below atmospheric may be employed if desired.

Another method of preparation of compounds of the presently provided class consists in condensation of a benzyl haloalkyl sulfide with an alkoxy aminoalkanol having at least one free amine hydrogen substituent. The condensation releases hydrogen halide to produce the (aralkylthioalkyl)amino alkoxy alkanol. This method can be used to make compounds, such as primary alkanols, not available by the alkylene oxide route.

Useful aralkyl haloalkyl sulfides include, for example, bromides, chlorides and iodides such as benzyl 2-chloroethyl sulfide, benzyl 3-chloropropyl sulfide, benzyl 3-bromopropyl sulfide, benzyl 3-iodobutyl sulfide, benzyl 2-chlorobutyl sulfide, benzyl 2-chloropropyl sulfide, 1-phenethyl 3-chloropropyl sulfide, (amylphenyl)methyl 3-chloropropyl sulfide, and so forth. Useful alkoxy aminoalkanols include, for example, 3-amino-2-methoxy-1-propanol, 2-amino-3-methoxy-1-dodecanol, 4-amino-3-methoxy-1,2-butanediol, and so forth.

Conditions for preparation of the compounds of the present invention by the condensation reaction may comprise merely contacting the halide with the amine. Their ratios may be about that of a 1:1 molar ratio, or an excess of either may be used. Acid is released by the condensation reaction, and desirably the halide and amine are contacted in the presence of a base. Useful bases are salts containing oxygen in the anion including hydroxides such as KOH, oxides such as lime, carbonates such as sodium carbonate, tertiary amines like triethylamine and pyridine, and so forth. The amount of base used will generally be approximately the calculated quantity needed to neutralize acid released, but more, such as up to 5 times the theoretical equivalent, may be used if desired.

As to the other conditions of reaction, the presence of solvents or diluents is desirable. These preferably are polar solvents, able to dissolve the base, such as the dimethyl ether of diethylene glycol, alcohols such as ethanol, and so forth. Temperatures may range from above freezing to below the decomposition temperatures of reaction mixture components; a range of 50°–150° C. is generally suitable. Pressure may also vary over a wide range, such as from sub-atmospheric pressures of down to, say, 50 millimeters' Hg, up to superatmospheric pressures of 1000 pounds per square inch or above. Generally, atmospheric pressures are suitable. It is usually desirable, however, to maintain a nitrogen atmosphere over the surface of the reaction mixtures to prevent access of air.

Generally, isolation of the amines of this invention is readily effected. It may be desirable to isolate the amine as a salt such as the hydrochloride salt. Practically any protonic acid can be used to form the acid addition salts, and useful acids, including physiologically acceptable acids such as hydrochloric and maleic, for forming salts of amines are well known in the art.

The aralkylthioalkylamino alkoxy alkanols provided by this invention range from mobile liquids to crystalline solids. They are useful for a wide variety of industrial, pharmaceutical and agricultural applications. These benzylthio compounds are readily converted by debenzylation as set forth in copending application S.N. 176,409, filed concurrently herewith by Robert J. Wineman, Morton H. Gollis and John C. James, to the corresponding mercaptoalkylamino alkoxy alkanols, which have demonstrated activity in protecting animals against the harmful effects of ionizing radiation. The aralkylthio compounds of the invention can also be desulfurized by treatment with Raney nickel to provide alkylamino alkoxy alkanols which may be employed as plasticizers for vinyl polymers such as polyvinyl chloride and as pharmaceuticals. The stated derivatives have advantageous properties as compared to the corresponding alkanols lacking the alkoxy group because of their altered hydrophilicity. Additionally, the presently provided compounds are intermediates for compounds other than alkanols; for example, they can be condensed with carboxyl compounds to provide sulfur-substituted oxazolidones having physiological activity, such as anticonvulsant activity. Furthermore, the ethers themselves may be employed as rubber chemicals, for example as antioxidants or to produce cross-linking and vulcanization of rubbers and rubbery polymers; as agricultural toxicants, to produce repression and kill off undesirable organisms such as weeds, insects, fungi, bacteria, nematodes, and the like; as physiological agents exerting pharmaceutical effects such as protection against the lethal and tissue damaging action of ionizing radiation; as surface-active and detergent agents; as chelating agents; as petroleum additives; and so forth.

The invention is illustrated but not limited by the following examples, in which all parts are by weight unless otherwise noted.

Example 1

A solution of 100 parts of 2-(benzylthio)ethylamine in methanol is maintained at 60° C. under a nitrogen atmosphere and stirred while enough 2,3-epoxypropyl methyl ether is added dropwise, over a period of three and a half hours, to provide a 1:1 molar ratio. The mixture is stirred for another half hour, and then the methanol is evaporated off, and the residue of the reaction mixture is distilled. Product 3([2-(benzylthio)ethyl]amino)-1-methoxy-2-propanol is collected as the fraction distilling over at 157–149° C./0.15–0.10 millimeters (mm.). The solidified product melts at 54–56° C. The molar refraction of the product found from the observed values $d_4^{20}$ 1.109, $n_D^{20}$ 1.5477 is 73.10; that calculated is 73.37. Elemental analysis for C, H and N also gives good agreement with theoretical values.

Example 2

Following the procedure described in Example 1, 55 parts of 2,3-epoxypropyl butyl ether is added to a solution of 140 parts of 2-(benzylthio)ethylamine in methanol to provide a 1:2 molar ratio of epoxide to amine. After removal of solvent, the residue is distilled, and 1-([2-(benxylthio)ethyl]amino) - 3 - butoxy-2-propanol is collected as the fraction boiling at 165–166° C./0.06–0.07 mm. (column head temperature). The molar refraction found from the observed values $n_D^{20}$ 1.5297 and $d_4^{20}$ 1.050 is 87.46, while that calculated is 87.23. Elemental analysis for C, H, N and S also gives values in good agreement with theoretical.

Example 3

Preparation of 3 - ([3 - (benzylthio)propyl]amino)-2-methoxy-1-propanol is accomplished by combining 1 mole each of benzyl 3-chloropropyl sulfide and 3-amino-2-methoxy-1-propanol with 1 mole of sodium carbonate in ethanol, and refluxing the reaction mixture under nitrogen. Solvent is then removed, water is added, and the aqueous solution is acidified with concentrated HCl. After extraction with ether, the aqueous layer is neutralized with 50% aqueous NaOH. The resulting oil is distilled to isolated 3 - ([3-(benzylthio)propyl]amino)-2-methoxy-1-propanol.

A similar procedure is followed to produce 1-([2-(benzylthio)ethyl]propylamino)-3-methoxy - 2 - propanol from benzyl 2-chloroethyl sulfide and 1-propylamino-3-methoxy-2-propanol.

While the invention has been described with specific reference to particular preferred embodiments thereof, it will be appreciated that modification and variation can be made within the scope of the appended claims without departing from the invention.

What is claimed is:

1. Aralkylthioalkylamino alkoxy alkanols of the formula

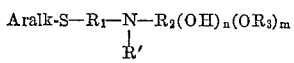

where each of $R_1$, $R_2$ and $R_3$ is saturated aliphatic hydrocarbon, $R'$ is selected from the group consisting of hydrogen and saturated aliphatic hydrocarbon, Aralk is an aralkyl hydrocarbon radical consisting of saturated aliphatic hydrocarbon substituted by a benzenoid ring, each said hydrocarbon radical is hydrocarbon of up to twelve carbon atoms, and $n$ and $m$ are small integers each having a value of from one to two.

2. The amines of claim 1 in which the aralkyl radical is benzyl.

3. 1-([2-(benzylthio)ethyl]amino) - 3 - methoxy-2-propanol.

4. 1-([2 - (benzylthio)ethyl]amino) - 3 - butoxy - 2-propanol.

5. 3-([-benzylthiopropyl]amino) - 2 - methoxy-1-propanol.

No references cited.

CHARLES B. PARKER, *Primary Examiner.*

LEON ZITVER, *Examiner.*